(12) United States Patent
Igarashi et al.

(10) Patent No.: US 12,037,772 B2
(45) Date of Patent: Jul. 16, 2024

(54) REMOTE CONTROL SYSTEM FOR WORK MACHINE

(71) Applicant: HITACHI CONSTRUCTION MACHINERY CO., LTD., Tokyo (JP)

(72) Inventors: Teruki Igarashi, Ibaraki (JP); Kento Kumagai, Ibaraki (JP); Akihiro Narazaki, Ibaraki (JP)

(73) Assignee: HITACHI CONSTRUCTION MACHINERY CO., LTD., Tokyo (JP)

(*) Notice: Subject to any disclaimer, the term of this patent is extended or adjusted under 35 U.S.C. 154(b) by 351 days.

(21) Appl. No.: 17/637,598

(22) PCT Filed: Mar. 10, 2021

(86) PCT No.: PCT/JP2021/009621
§ 371 (c)(1),
(2) Date: Feb. 23, 2022

(87) PCT Pub. No.: WO2021/193073
PCT Pub. Date: Sep. 30, 2021

(65) Prior Publication Data
US 2022/0275604 A1    Sep. 1, 2022

(30) Foreign Application Priority Data
Mar. 27, 2020 (JP) .............................. 2020-057933

(51) Int. Cl.
*E02F 9/20* (2006.01)
*E02F 9/24* (2006.01)
(Continued)

(52) U.S. Cl.
CPC ............. *E02F 9/205* (2013.01); *E02F 9/24* (2013.01); *G05D 1/0016* (2013.01); *H04W 24/08* (2013.01)

(58) Field of Classification Search
None
See application file for complete search history.

(56) References Cited

U.S. PATENT DOCUMENTS 8,340,819 B2 * 12/2012 Mangaser .............. G16H 40/63
700/250
2011/0306986 A1 * 12/2011 Lee ........................ A61B 34/37
606/130
(Continued)

FOREIGN PATENT DOCUMENTS

JP     08-237758 A    9/1996
JP     2017-005416 A  1/2017
(Continued)

OTHER PUBLICATIONS

Japanese to English Translation of JP-6787112-B2 using Google Patents (Year: 2024).*
(Continued)

*Primary Examiner* — Thomas E Worden
(74) *Attorney, Agent, or Firm* — MATTINGLY & MALUR, PC

(57) ABSTRACT

Provided is a remote control system for work machine capable of enhancing the stability and efficiently improving the operability. A remote control system for a work machine having a plurality of actuators 31 corrects all command signals for the actuators 31 being operated when a communication delay time occurs during operation with the actuators 31. This limits the operation of the actuators 31 while keeping the ratio of the command signals (operation signals) of the actuators 31.

8 Claims, 17 Drawing Sheets

(51) Int. Cl.
*G05D 1/00* (2024.01)
*H04W 24/08* (2009.01)

(56) References Cited

U.S. PATENT DOCUMENTS

| | | | |
|---|---|---|---|
| 2012/0191464 A1* | 7/2012 | Stuart | G05D 1/0038 |
| | | | 901/1 |
| 2020/0133259 A1* | 4/2020 | Van Wiemeersch | H04W 4/40 |
| 2020/0174465 A1 | 6/2020 | Minagawa et al. | |
| 2023/0128665 A1* | 4/2023 | Kottenstette | A61B 34/37 |
| | | | 700/245 |

FOREIGN PATENT DOCUMENTS

| | | | |
|---|---|---|---|
| JP | 2018-21395 A | 2/2018 | |
| JP | 2018-107568 A | 7/2018 | |
| JP | 2019-065657 A | 4/2019 | |
| JP | 6787112 B2 * | 11/2020 | |
| WO | 2012/061888 A1 | 5/2012 | |
| WO | WO-2019222641 A1 * | 11/2019 | A61B 34/25 |

OTHER PUBLICATIONS

Chinese Office Action received in corresponding Chinese Application No. 202180004921.3 dated Aug. 22, 2023.
International search Report of PCT/JP2021/009621 dated May 25, 2021.

\* cited by examiner

REMOTE CONTROL SYSTEM FOR WORK MACHINE

TECHNICAL FIELD

The present invention relates to a remote control system for work machine having a plurality of actuators.

BACKGROUND ART

With the recent spread of the Internet and the faster communication speed, efforts are being made to build remote control systems in various fields such as automobiles, drones, robots, and work machines for remote control via communication networks.

Among them, a work machine is remotely controlled as follows: a camera mounted on the work machine, which is the target device to be controlled, is used to capture an image of the target device and its surroundings, and the captured image is transmitted from the target device to a remote controller. An operator then monitors the image displayed on the remote controller for operation, and transmits the operated control signal from the remote controller to the target device to remotely control the target device. When the target device is used outdoors, a wireless communication network is often used between the target device and the communication network.

In the wireless communication network, however, data packet loss, a communication delay, and communication speed fluctuations may occur due to changes in received signal quality and communication line congestion. In this case, the stability or the operability of a remote control system for real-time control may deteriorate. For example, when the operator wants a front unit of a hydraulic excavator to move along the desired trajectory, a large communication delay in the wireless communication network, if any, may delay the image displayed on the monitor. In that case, the operator will not be able to accurately understand the actual state of the front unit. This makes it difficult to move the front unit accurately in real time, which may reduce the work efficiency. Studies have been made to enable stable remote control even when a communication delay or fluctuations in communication speed occur between the remote controller and the target device.

Patent Literature 1 describes a technique of solving the communication delay of a remote control system. This conventional technology describes a remote controller that remotely controls a target device via a communication network. The remove controller calculates the amount of overshoot, which may occur due to the communication delay time, from the communication delay time and the operating speed of the target device, and limits the operating speed so that the overshoot amount is less than a preset threshold.

CITATION LIST

Patent Literature

Patent Literature 1: JP 2018-107568 A

SUMMARY OF INVENTION

Technical Problem

When the technique described in Patent Literature 1 is applied to a work machine that needs to operate a plurality of actuators at the same time, the overshoot amount due to the communication delay is calculated and the threshold is set for each of the actuators. This means that if only one of the actuators has to be limited in the operating speed in a certain communication delay state, then only the specific actuator is decelerated, which causes off-balance in the combined operation of the work machine. That is, in the case of remote control of a plurality of actuators of a work machine, if an overshoot only for a specific actuator occurs due to a communication delay, the work machine will inefficiently operate in an unintended manner of the operator.

For example, assume that the work machine is performing excavation work with the boom, the arm, and the bucket. If an overshoot of the actual speed occurs only for the arm speed relative to the speed intended by the operator due to a communication delay time, only the commanded speed of the arm is limited so that the overshoot amount of the arm speed is less than a predetermined value. In this case, assuming that no overshoot due to the communication delay time occurs for the boom and the bucket, the commanded speeds of the boom and the bucket are not limited. As a result, only the arm speed is limited relative to the intended speed of the operator, which makes it impossible to operate the work machine as the operator intends, and worsens the operability.

Further, the remote control has a general problem: when the communication delay time becomes large, the difference between the state of the work machine viewed by the operator through the communication network with the camera and the state of the actual work machine becomes large. Therefore, the work machine may operate in a significantly different manner from the intention of the operator.

In view of the above problems, the present invention provides a remote control system for work machine capable of enhancing the stability and efficiently improving the operability.

Solution to Problem

To solve the above problems, a remote control system for a work machine according to the present invention includes: an operation lever to let an operator operate a plurality of actuators of the work machine; an operator-side remote controller configured to transmit command signals for operating the plurality of actuators via a communication network, the command signals being generated in response to operation with the operation lever; a work-machine side remote controller configured to receive the command signals via the communication network and transmit the command signals to the work machine; a delay state determination device configured to determine a communication delay state of the command signals that the work-machine side remote controller receives relative to the command signals transmitted from the operator-side remote controller; and a command signal correction device configured to, when it is determined that the communication delay state is worse than a preset delay state determination threshold, correct all the command signals of the plurality of actuators being operated so as to maintain a ratio among the command signals.

Advantageous Effects of Invention

According to the present invention, a remote control system for a work machine having a plurality of actuators corrects all command signals for the actuators being operated when a communication delay time occurs during operation with the actuators. This limits the operation of the actuators while keeping the ratio of the command signals (operation signals) of the actuators, and thus keeps the operating balance of the actuators that the operator intends and facilitates the operation. Limiting the command signals in this way reduces the deviation between the operating state of the work machine that the operator can understand on the monitor and the actual operating state of the work machine, so that the operator is able to input accurate feedback to the operation levers based on the visual result on the work machine displayed on the monitor for efficient work.

Other problems, configurations and advantageous effects also will be clear from the following descriptions of the embodiments.

DESCRIPTION OF EMBODIMENTS

The following describes some embodiments of the present invention, with reference to the attached drawings. In the attached drawings, like numbers indicate like components having the same functions to omit their duplicated descriptions. This embodiment exemplifies a work machine by way of a hydraulic excavator. The work machine is not limited to a hydraulic excavator, and is applicable to construction machines such as wheel loaders, cranes, bulldozers, dumps, and road machines, and general work machines other than construction machines, as long as the operator can operate a plurality of actuators of the work machine by remote control.

First Embodiment

[Overall Configuration of Remote Control System]

Figure 1:
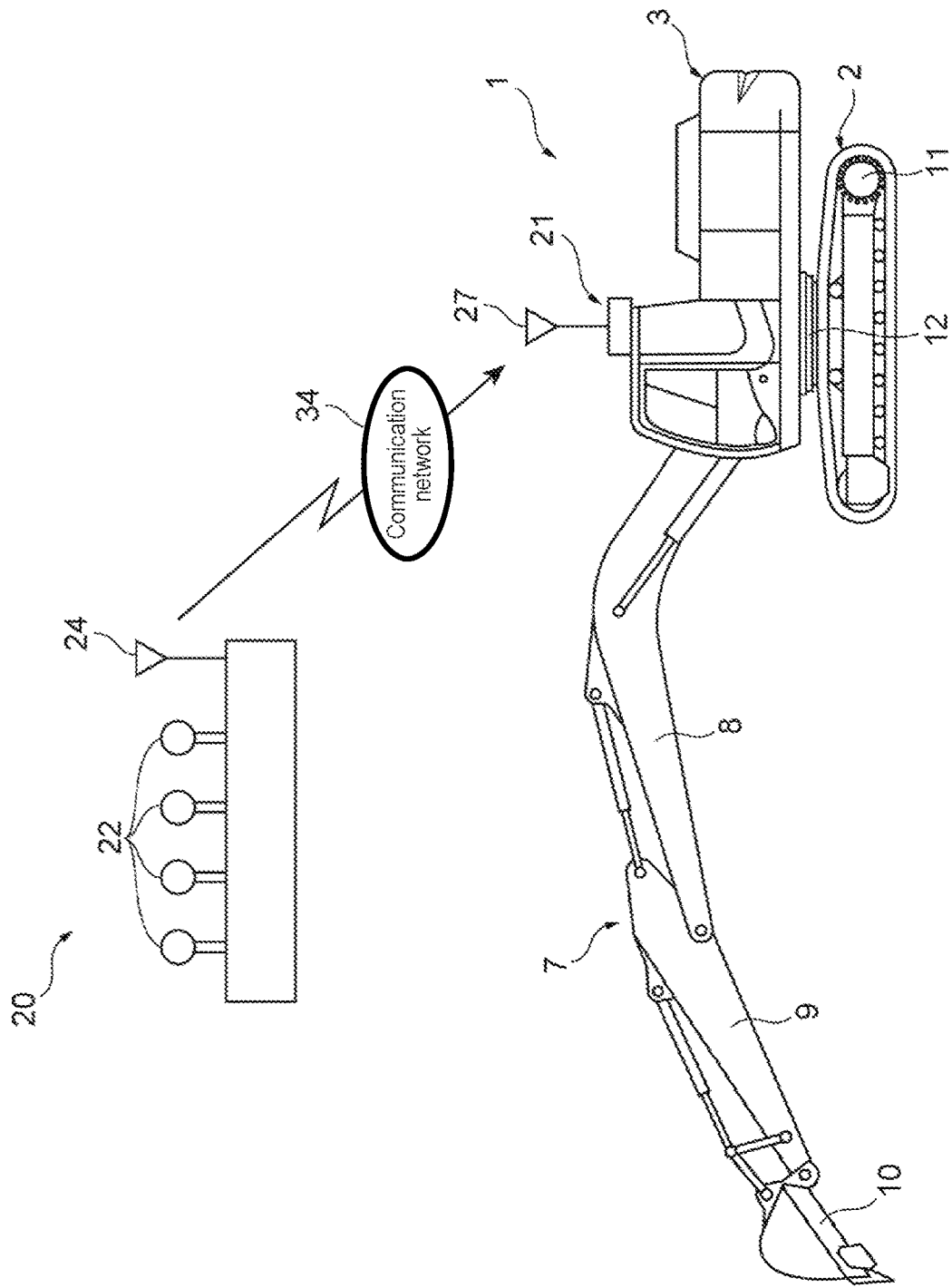
FIG. 1 schematically shows the structure of a remote control system for hydraulic excavator that is one example of the work machine according to a first embodiment.
Figure 2:
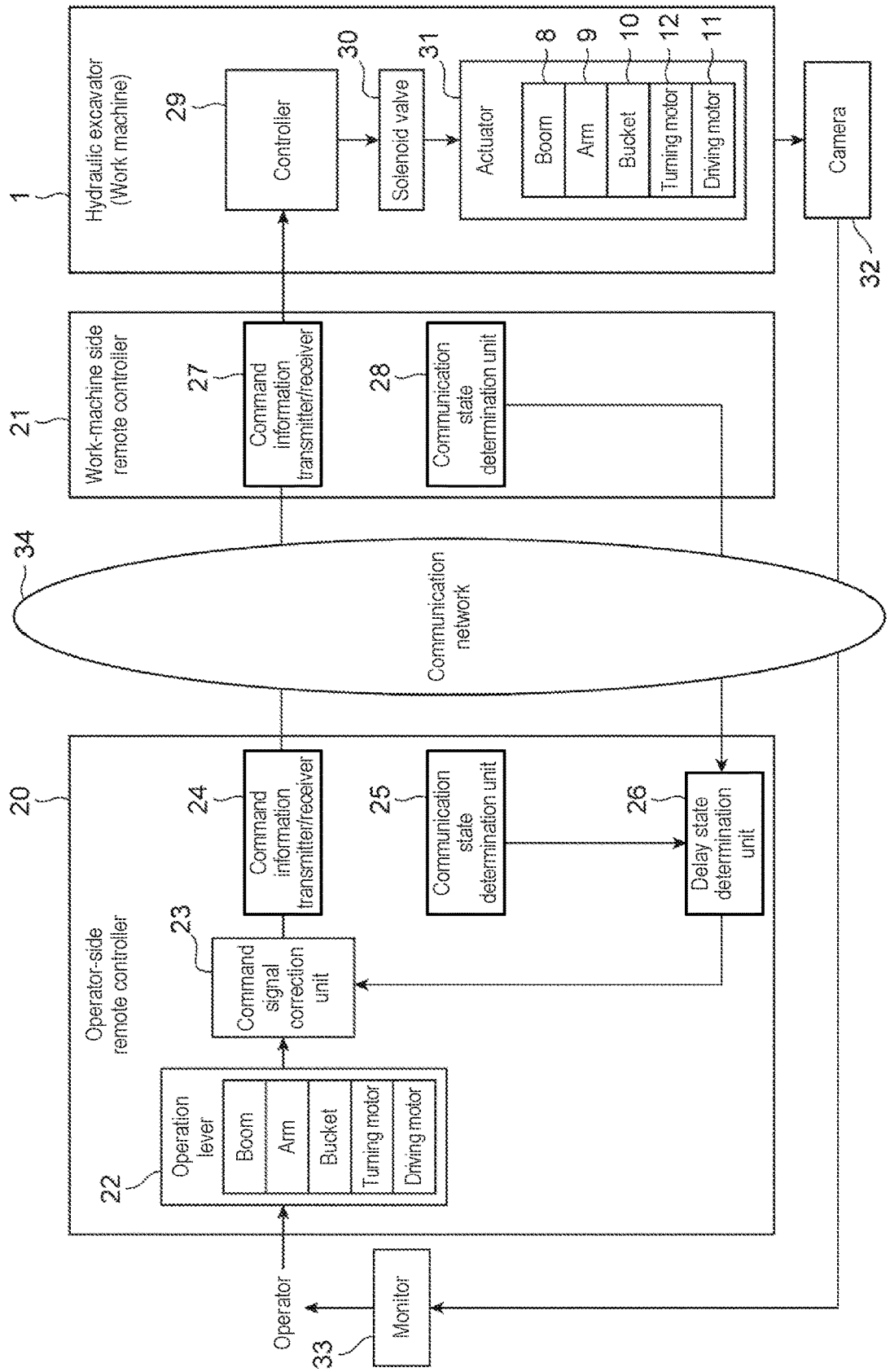
FIG. 2 is a block diagram of the structure of the remote control system for hydraulic excavator that is one example of the work machine according to the first embodiment.

FIGS. 1 and 2 show a remote control system for hydraulic excavator that is one example of the work machine according to a first embodiment, where FIG. 1 schematically shows the structure, and FIG. 2 is a block diagram of the structure.

As shown in FIG. 1, the hydraulic excavator (work machine) 1 includes a crawler-type lower traveling body 2, an upper turning body 3 mounted to be able to turn relative to the lower traveling body 2, and a front unit 7 attached to the front of the upper turning body 3 to be able to move up and down and perform works such as excavation.

The lower traveling body 2 includes a pair of left and right driving motors 11 (hereinafter, they may be referred to as a right driving motor 11 and a left driving motor 11). The upper turning body 3 includes a prime mover such as an engine, a hydraulic pump, and a turning motor 12. The front unit 7 has a boom 8, an arm 9, and a bucket 10, which are driven by a boom cylinder, an arm cylinder, and a bucket cylinder, respectively, that are hydraulic cylinders driven by hydraulic oil. The boom 8, the arm 9, the bucket 10, the turning motor 12, and the driving motor 11 constitute actuators 31 of the work machine of the present embodiment (see FIG. 2).

The hydraulic excavator 1 includes a work-machine side remote controller 21 provided with units such as a command information transmitter/receiver 27 for transmitting/receiving command information (command signal). An operator-side remote controller (this may be called a wireless remote controller) 20 is provided outside the hydraulic excavator 1, for example in the control room, and this operator-side remote controller 20 includes a command information transmitter/receiver 24 for transmitting/receiving command information (command signal). The remote control system of the present embodiment is wireless communicable of (transmitting and receiving) information and signals between the operator-side remote controller 20 (the command information transmitter/receiver 24 thereof) and the work-machine side remote controller 21 (the command information transmitter/receiver 27 thereof) via a communication network 34.

The operator-side remote controller 20 of the present embodiment includes a plurality of remote-control operation levers (hereinafter, simply referred to as operation levers) 22 to let the operator operate each of the plurality of actuators 31 (boom 8, arm 9, bucket 10, left and right driving motors 11, and turning motor 12). In response to the operation of these operation levers 22 by the operator, a command signal corresponding to the operation of each operation lever 22 (displacement of the operation lever) is generated to operate the actuator 31 (boom 8, arm 9, bucket 10, left and right driving motors 11, or turning motor 12) corresponding to the operation lever 22, and is output to the command information transmitter/receiver 24.

As shown in FIG. 2, the hydraulic excavator 1 has a basic configuration including: a plurality of solenoid valves 30 that generate hydraulic signals for operating the plurality of actuators 31; and a controller 29 that controls the operation (status) of the plurality of actuators 31. To this end, the controller 29 converts a command signal input from the outside (in this case, the command information transmitter/receiver 27 of the work-machine side remote controller 21) into a current for a command to the solenoid valves 30.

The following describes the embodiment of applying the remote control system of the present embodiment to a typical hydraulic excavator 1 having an electric lever system that is configured so that a command signal generated in response to the operation with the operation levers 22 in the operation room as shown in FIGS. 1 and 2 is sent to the solenoid valves 30 via the controller 29, and the actuators 31 (boom 8, arm 9, bucket 10, left and right driving motors 11, and turning motor 12) are operated based on the hydraulic pressure from the solenoid valves 30 via a control valve.

A detailed description on the configuration of such a typical hydraulic excavator 1 is omitted here.

As shown in the drawing, the operation levers 22 and the operator-side remote controller 20 may be configured as one device (in other words, the operator-side remote controller 20 includes the operation levers 22), or they may configured as separate devices. As shown in the drawing, the hydraulic excavator (work machine) 1 and the work-machine side remote controller 21 may be configured as separate devices, or may be configured as one device (in other words, the hydraulic excavator 1 internally includes the work-machine side remote controller 21).

[Block Configuration of the Remote Control System]

Although not shown, the operator-side remote controller 20 and the work-machine side remote controller 21 described above are configured as a microcomputer that includes a central processing unit (CPU) that performs various calculations, a memory such as a read only memory (ROM) or a hard disk drive (HDD) that stores programs for executing calculations by the CPU, and a random access memory (RAM) that is a work area where the CPU executes programs. Various functions of the operator-side remote controller 20 and the work-machine side remote controller 21 are implemented by the CPU loading various programs stored in the memory into the RAM for execution.

The operator operates the actuators 31 (boom 8, arm 9, bucket 10, left and right driving motors 11, and turning motor 12) of the work machine with the operation levers 22 in the operator-side remote controller 20 shown in FIG. 2.

Specifically, a monitor 33 displays the video of the operating state of the hydraulic excavator 1 (actuators 31) taken by a camera 32 from the outside, for example, in the control room, via the communication network 34. Then, the operator operates the operation levers 22 in the operator-side remote controller 20 while viewing the video on the monitor 33 for remote control of the actuators 31 of the work machine. That is, the camera 32 is an operation state confirmation device for confirming the operation state of the hydraulic excavator 1 (actuators 31) from the outside, and the monitor 33 is an operation state display device that receives the output (video) of the camera (operation state confirmation device) 32 via the communication network 34 to let the operator view the video.

As shown in FIG. 2, the operator-side remote controller 20 includes: a command signal correction unit (command signal correction device) 23 that corrects command signals generated in response to the operation of the operation levers 22 based on the output of a delay state determination unit (delay state determination device) 26; a command information transmitter/receiver 24 that transmits command information (specifically, command signals output from the command signal correction unit 23) via the communication network 34; a communication state determination unit 25 that determines the communication state of the operator-side remote controller 20; and the delay state determination unit 26 that determines a communication delay state (hereinafter this may be simply referred to as a delay state) with the work-machine side remote controller 21 based on the output of a communication state determination unit 28 that determines the communication state of the work-machine side remote controller 21 and the output of the communication state determination unit 25 that determines the communication state of the operator-side remote controller 20.

The work-machine side remote controller 21 of the hydraulic excavator 1 includes: a command information transmitter/receiver 27 that receives command information (command signals) from the operator-side remote controller 20 (command information transmitter/receiver 24 thereof) via the communication network 34 and transmits the command signals to the controller 29 of the hydraulic excavator 1; and the communication state determination unit 28 that determines a communication state of the work-machine side remote controller 21.

[Operation of the Delay State Determination Unit 26 of the Operator-Side Remote Controller 20]

As described above, the delay state determination unit 26 determines the communication delay state with the work-machine side remote controller 21 based on the outputs of the communication state determination unit 25 of the operator-side remote controller 20 and of the communication state determination unit 28 of the work-machine side remote controller 21. Specifically, the delay state determination unit 26 determines the communication delay state of the command signal that the command information transmitter/receiver 27 of the work-machine side remote controller 21 receives relative to the command signal transmitted from the command information transmitter/receiver 24 of the operator-side remote controller 20, based on the outputs of the communication state determination unit 25 of the operator-side remote controller 20 and of the communication state determination unit 28 of the work-machine side remote controller 21.

Specifically, the delay state determination unit 26 determines the communication delay state as follows: the communication state determination units 25 and 28 monitor the radio wave strengths of the remote controllers (20, 21) on the operator side and the work machine side, respectively, and the delay state determination unit 26 outputs an overall communication delay state based on the two results.

Assume that the radio wave strength of the operator-side remote controller 20 (monitored by the communication state determination unit 25) is $\alpha$ and the radio wave strength of the work-machine side remote controller 21 (monitored by the communication state determination unit 28) is $\beta$. Then, the delay state determination unit 26 calculates the delay state as $Ls=\alpha \times \beta$. The higher the radio wave strengths $\alpha$ and $\beta$, the better the communication condition, and the smaller the radio wave strengths $\alpha$ and $\beta$, the worse the communication condition.

[Operation of the Command Signal Correction Unit 23 of the Operator-Side Remote Controller 20]

Figure 3:
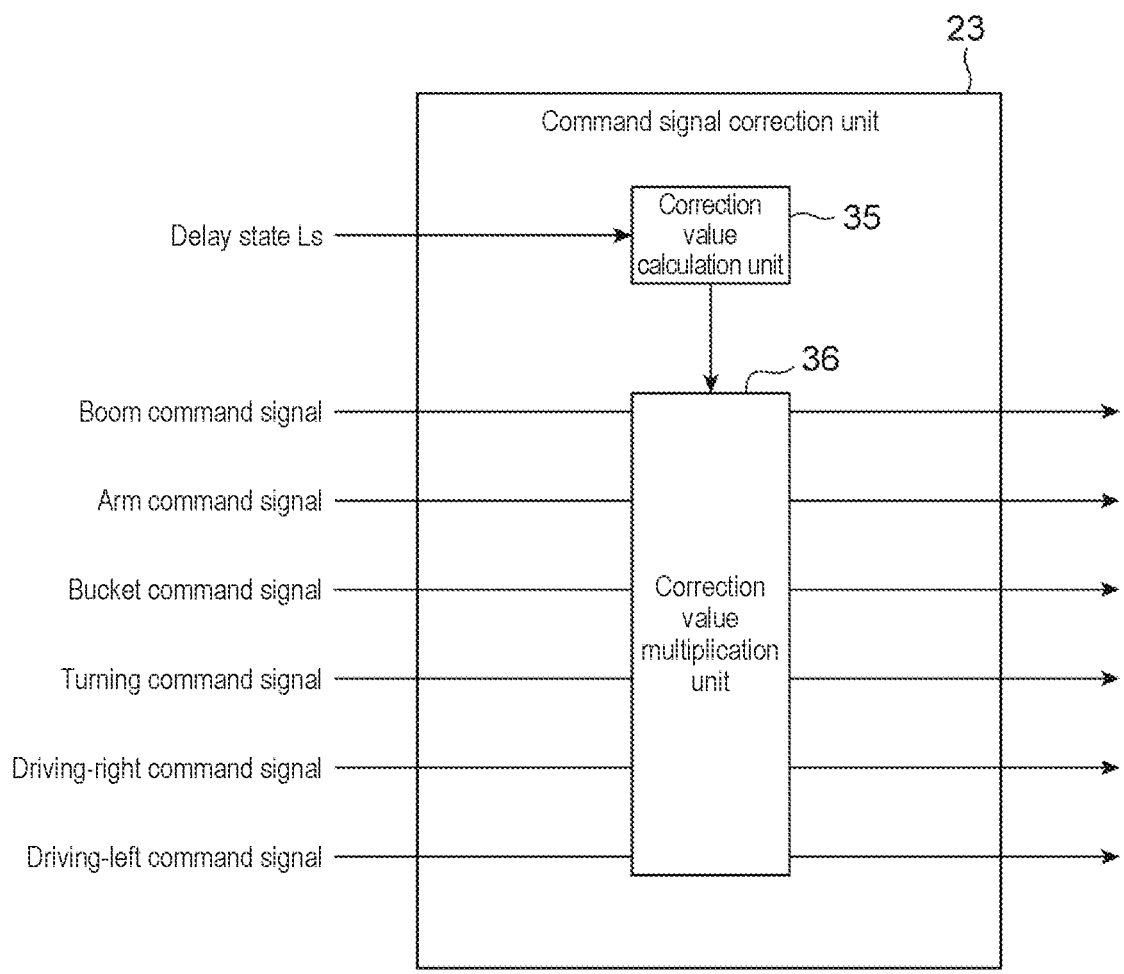
FIG. 3 is a block diagram of the structure of a command signal correction unit according to the first embodiment.
Figure 4:
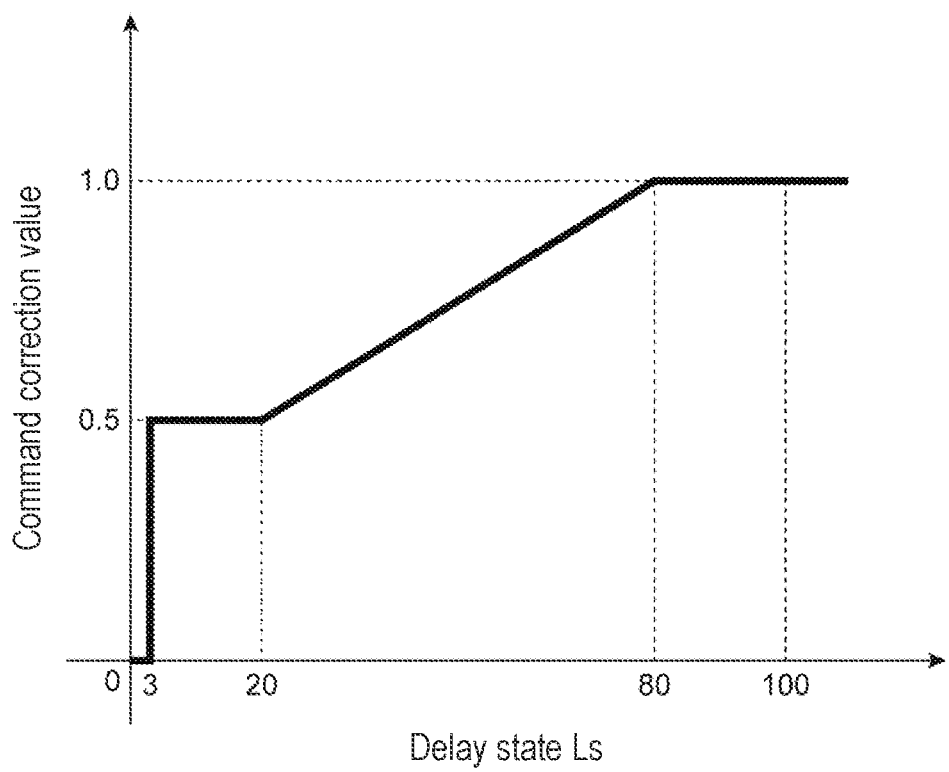
FIG. 4 shows a calculation table of a command value calculation unit based on a delay state according to the first and second embodiments.

As shown in FIG. 3, the command value correction unit 23 includes a correction value calculation unit 35 and a correction value multiplication unit 36. The correction value calculation unit 35 outputs a command correction value to correct the command signals output from the operation levers 22. The command correction value is determined based on the delay state Ls, which is the output result of the delay state determination unit 26, in accordance with the graph (calculation table) shown in FIG. 4. The graph of FIG. 4 shows the command correction value calculated based on the delay state Ls. For example, during the delay state Ls=80 to 100, which is determined a good communication state, the command correction value of 1.0 is output, which means that the command signals are not corrected. During the delay state Ls=20 to 80, as the delay state Ls decreases (that is, the communication state worsens), the command correction value decreases gradually from 1.0 to 0.5 (proportionately in this example). That is, Ls=80 is set as the threshold to determine whether the correction is necessary or not based on the delay state Ls output from the delay state determination unit 26. If the delay state determination unit 26 outputs the delay state Ls that is smaller (that is, worsening) than the delay state determination threshold Ls=80, a command correction value less than 1.0 is output for correcting the command signals. Further, when the delay state is less than Ls=3, it is determined that the communication state is extremely bad, and the command correction value for the delay state is immediately lowered to 0. In other words, Ls=3 is set as the threshold to determine whether the communication state is extremely poor and the communication is disrupted. If the delay state Ls output from the delay state determination unit 26 is smaller (i.e., worsening) than Ls=3 as the communication disruption determination threshold, it is determined that the communication is disrupted. Then the command correction value of 0 is output to correct the command signals so that the plurality of actuators 31 do not operate.

The correction value multiplication unit 36 multiplies all of the command signals output from the operation levers 22 being operated (i.e., all the command signals of the plurality of actuators 31 being operated with the operation levers 22) by the command correction value calculated by the correction value calculation unit 35 for (uniform) correction. This operation uniformly corrects all command signals in the operator-side remote controller 20 (i.e., before the command signals output from the operation levers 22 are transmitted from the operator-side remote controller 20 to the work-machine side remote controller 21), which keeps the ratio of the multiple operation-lever displacements input to the operation levers 22 by the operator.

[Operation of the Command Information Transmitter/Receiver 24 and the Like of the Operator-Side Remote Controller 20]

The command information transmitter/receiver 24 transmits the (corrected) command signals output from the correction value multiplication unit 36 of the command value correction unit 23 to the command information transmitter/receiver 27 of the work-machine side remote controller 21 via the communication network 34. The command information transmitter/receiver 27 of the work-machine side remote controller 21 then transmits the command signals received from the command information transmitter/receiver 24 of the operator-side remote controller 20 via the communication network 34 to the controller 29 of the hydraulic excavator 1. The controller 29 controls the operation (state) of the plurality of actuators 31 according to the method described above.

As a result, during Ls=80 to 100 where the communication state between the operator-side remote controller 20 and the work-machine side remote controller 21 is determined to be in good condition, the operation speed of the actuators 31 (boom 8, arm 9, bucket 10, left and right driving motors 11, and turning motor 12) of the work machine is not limited (decelerated), and during Ls=20 to 80 (i.e., it is determined that the delay state Ls output from the delayed determination unit 26 is worse than the delay state determination threshold Ls=80), the operating speed of the actuators 31 (boom 8, arm 9, bucket 10, left and right driving motors 11, turning motor 12) of the work machine is (uniformly) limited (decelerated) in accordance with the degree of worsening of the delay state Ls. If the delay state Ls is less than Ls=3 (i.e., it is determined that the delay state Ls output from the delay state determination unit 26 is worse than Ls=3, which is the threshold for determining communication disruption), the communication is determined disrupted. In this case, the actuators 31 (boom 8, arm 9, bucket 10, left and right driving motors 11, and turning motor 12) of the work machine will not operate in response to the operation by the operator with the operation levers 22.

[Advantageous Effects]

In general, if a communication delay occurs when operating a plurality of actuators 31, the actual operation of the work machine will be delayed compared with the command signals input by the operator via the operation levers 22. In this case, the operator who observes the movement of the work machine displayed on the monitor 33 may recognize that the actuators 31 are not moving as intended, and may increase the displacement of the operation levers 22 (that is, the command signal).

As a result, the actual speed of the actuators 31 becomes faster than the speed of the actuators 31 aimed at by the operator, resulting in an overshoot. When the work machine is performing excavation, including boom raising, arm crowding, and bucket crowding operations, if an overshoot occurs for the boom raising speed, the boom will rise too high and the operator fails to excavate earth and sand as intended, resulting in poor efficiency. If an overshoot occurs for the arm crowding speed, this causes excessive arm crowding to excavate too much, leading to deterioration of efficiency if corrective work is required.

For an overshoot of boom raising, the control of Patent Literature 1 acts to correct a command signal only for boom raising. In this case, the boom will not rise, and the work machine excavates too much, leading to deterioration of efficiency.

In this case, the present embodiment allows (uniform) multiplication of all of the command signals for boom raising, arm crowding, and bucket crowding by the command correction value according to the delay state, and thus allows the command signals to keep the operation balance as intended by the operator according to the delay state and suppresses the overshoot of the actual speed of the actuators 31 of the work machine compared with the speed of the actuators 31 that the operator intends, making it easier for the work machine to perform the operator's intended motion. As a result, if a communication delay occurs in remote control of the work machine with the plurality of actuators 31, this configuration prevents deterioration of efficiency.

As described above, the first embodiment includes: the operation levers 22 for the operator to operate the plurality of actuators 31 of the work machine; the operator-side remote controller 20 that transmits command signals for operating the plurality of actuators 31 via the communication network 34, the command signals being generated in response to the operation with the operation levers 22; the operator-side remote controller 21 that receives the command signals via the communication network 34 and transmits the command signals to the work machine; the delay state determination unit (delay state determination device) 26 that determines a communication delay state of the command signals that the work-machine side remote controller 21 receives relative to the command signals transmitted from the operator-side remote controller 20; and the command signal correction unit (command signal correction device) 23 that, when it is determined that the communication delay state is worse than a preset delay state determination threshold, corrects all the command signals of the plurality of actuators 31 being operated so as to maintain their ratio.

The command signal correction unit (command signal correction device) 23 corrects all the command signals of the plurality of actuators 31 being operated so that the operating speed of the plurality of actuators 31 becomes slower as the communication delay state worsens.

When the communication delay state is determined to be worse than a preset communication disruption determination threshold, the command signal correction unit (command signal correction device) 23 determines that communication is disrupted and corrects all the command signals of the plurality of actuators 31 being operated so that the plurality of actuators 31 will not operate.

In other words, when an overshoot of the operating speed of the actuators 31 occurs due to the communication delay time, the first embodiment limits a plurality of command speeds so as not to cause off-balance of the operating speeds of the actuators 31 being operated. The method for limiting a command speed so as not to cause off-balance of the operator's intended operation speed is uniformly correcting all of the operation signals in the operator-side remote controller 20 so as to keep the ratio of the plurality of operation lever displacements input by the operator with the operation levers 22.

According to the first embodiment, a remote control system for a work machine having a plurality of actuators 31 corrects all command signals for the actuators 31 being operated when a communication delay time occurs during operation with the actuators 31. This limits the operation of the actuators 31 while keeping the ratio of the command signals (operation signals) of the actuators 31, and thus keeps the operating balance of the actuators 31 that the operator intends and facilitates the operation. Limiting the command signals in this way reduces the deviation between the operating state of the work machine that the operator can understand on the monitor 33 and the actual operating state of the work machine, so that the operator is able to input accurate feedback to the operation levers 22 based on the visual result on the work machine displayed on the monitor 33 for efficient work.

In the first embodiment, the delay state determination unit (delay state determination device) 26 and the command signal correction unit (command signal correction device) 23 are provided in the operator-side remote controller 20, and the command signal correction unit (command signal correction device) 23 corrects all the command signals for the plurality of actuators 31 being operated before the command signals are transmitted from the operator-side remote controller 20 to the work-machine side remote controller 21.

The first embodiment enables correction with consideration given to a delay of a command signal that the operator-side remote controller 20, which is a wireless remote controller, transmits to the work-machine side remote controller 21 (via the communication network 34). One operator-side remote controller 20 may control the operation of a plurality of hydraulic excavators 1 while switching them. In this case, the number of components of each hydraulic excavator 1 (i.e., of the work-machine side remote controller 21) can be reduced, so that this embodiment reduces the cost as compared with a second embodiment described later, for example.

Modified Example (1)

In another example, the delay state determination unit 26 may determine a communication delay state as follows: the communication state determination units 25 and 28 monitor the transmission time when the operator-side remote controller 20 transmits a command signal and the reception time when the work-machine side remote controller 21 receives the command signal, and the delay state determination unit 26 outputs a communication delay based on the two results.

Assume that the time when the operator-side remote controller 20 transmits a signal is T1 (monitored by the communication state determination unit 25) and the time when the work-machine side remote controller 21 receives the signal is T2 (monitored by the communication state determination unit 28). Then, the delay state determination unit 26 calculates the delay time as $Lt=T2-T1$. The smaller the delay time $Lt$, the better the communication condition, and the larger the delay time $Lt$, the worse the communication condition.

Figure 5:
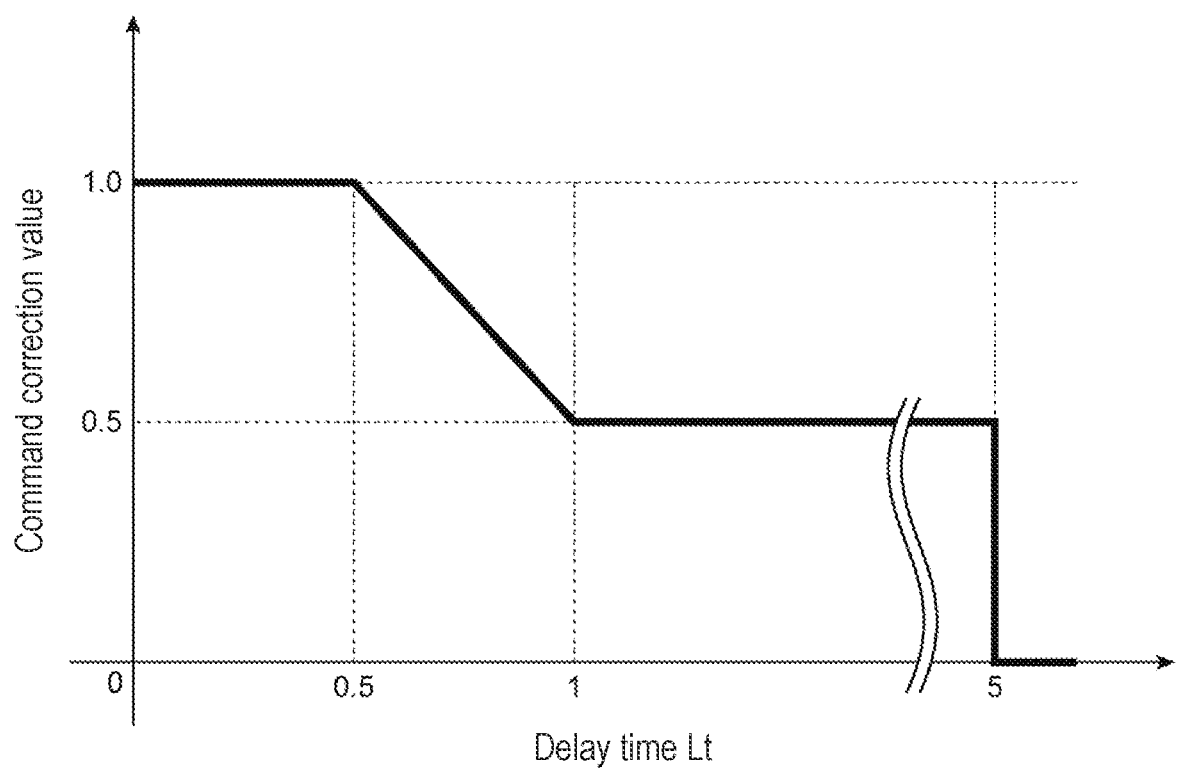
FIG. 5 shows a calculation table of the command value calculation unit based on a delay time according to the first and second embodiments.

In this case, the correction value calculation unit 35 of the command value correction unit 23 outputs a command correction value to correct the command signals output from the operation levers 22. The command correction value is determined based on the delay time $Lt$, which is the output result of the delay state determination unit 26, in accordance with the graph (calculation table) shown in FIG. 5. The graph of FIG. 5 shows the command correction value calculated based on the delay time $Lt$. For example, during the time $Lt=0$ to 0.5 second, which is determined a good communication state, the command correction value of 1.0 is output, which means that the command signals are not corrected. During the time $Lt=0.5$ to 1, as the delay time $Lt$ increases (i.e., the communication state worsens), the command correction value decreases gradually from 1.0 to 0.5 (proportionately in this example). That is, $Lt=0.5$ is set as the threshold to determine whether the correction is necessary or not based on the delay time $Lt$ output from the delay state determination unit 26. If the delay state determination unit 26 outputs the delay time $Lt$ that is larger (that is, worsening) than the delay state determination threshold $Lt=0.5$, a command correction value less than 1.0 is output for correcting the command signals. Further, when the delay time is $Lt=5$ or more, it is determined that the communication state is extremely bad, and the command correction value for the delay state is immediately lowered to 0. In other words, $Lt=5$ is set as the threshold to determine whether the communication state is extremely poor and the communication is disrupted. If the delay time $Lt$ output from the delay state determination unit 26 is larger (i.e., worsening) than $Lt=5$ as the communication disruption determination threshold, it is determined that the communication is disrupted. Then the command correction value of 0 is output to correct the command signals so that the plurality of actuators 31 do not operate.

The correction value multiplication unit 36 of the command correction unit 23 multiplies all of the command signals output from the operation levers 22 being operated (i.e., all the command signals of the plurality of actuators 31 being operated with the operation levers 22) by the command correction value calculated by the correction value calculation unit 35 for (uniform) correction. This operation uniformly corrects all command signals in the operator-side remote controller 20 (i.e., before the command signals output from the operation levers 22 are transmitted from the operator-side remote controller 20 to the work-machine side remote controller 21), which keeps the ratio of the multiple operation-lever displacements input to the operation levers 22 by the operator.

As a result, during Lt=0 to 0.5 where the communication state between the operator-side remote controller 20 and the work-machine side remote controller 21 is determined to be in good condition, the operation speed of the actuators 31 (boom 8, arm 9, bucket 10, left and right driving motors 11, and turning motor 12) of the work machine is not limited (decelerated), and during Lt=0.5 to 1 (i.e., it is determined that the delay time Lt output from the delayed determination unit 26 is worse than the delay state determination threshold Lt=0.5), the operating speed of the actuators 31 (boom 8, arm 9, bucket 10, left and right driving motors 11, turning motor 12) of the work machine is (uniformly) limited (decelerated) in accordance with the degree of worsening of the delay time Lt. If the delay time Lt is more than Lt=5 (i.e., it is determined that the delay time Lt output from the delay state determination unit 26 is worse than Lt=5, which is the threshold for determining communication disruption), the communication is determined disrupted. In this case, the actuators 31 (boom 8, arm 9, bucket 10, left and right driving motors 11, and turning motor 12) of the work machine will not operate in response to the operation by the operator with the operation levers 22.

Modified Example (2)

Figure 6:
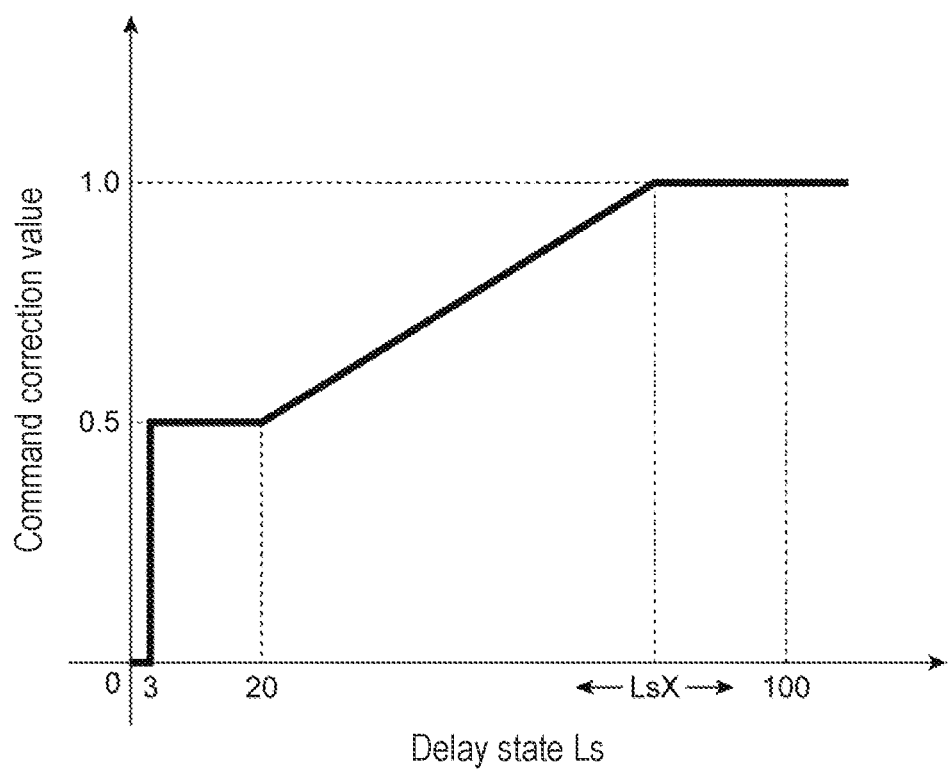
FIG. 6 shows a modified example of the calculation table of the command value calculation unit based on a delay state according to the first and second embodiments.
Figure 7:
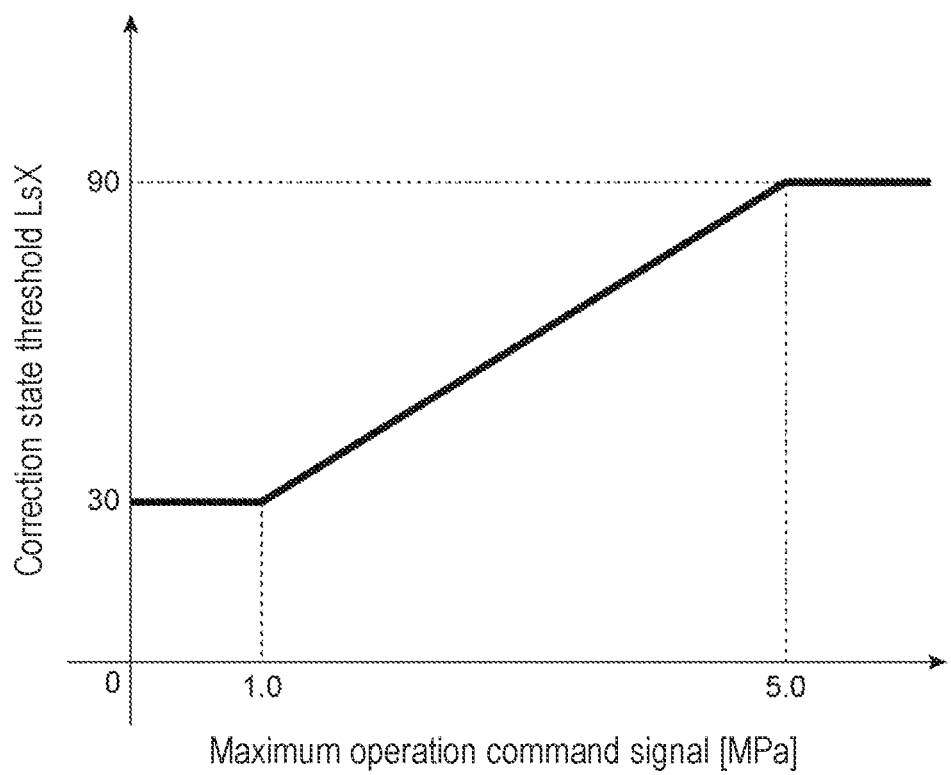
FIG. 7 shows a calculation table of the correction state threshold based on the maximum operation command signal according to the first and second embodiments.

The relationship between the delay state Ls and the command correction value used in the command value correction unit 23 (correction value calculation unit 35 thereof) may be set as shown in FIG. 6. In the graph (calculation table) of FIG. 6, the threshold LsX of the delay state Ls (the threshold to determine whether correction is required or not, hereinafter also referred to as the correction state threshold), from which the command correction value starts to decrease from 1.0, is determined based on the graph (calculation table) in FIG. 7. FIG. 7 shows the relationship between the largest operation command signal (hereinafter referred to as maximum operation command signal) for the command signals of the actuators 31 being operated in the work machine and the correction state threshold LsX. According to the graph in FIG. 7, the larger the maximum operation command signal, the larger the correction state threshold LsX from which the command correction value starts to fall from 1.0, and the smaller the maximum operation command signal, the smaller the correction state threshold LsX from which the command correction value starts to fall from 1.0.

This is because when the maximum operation command signal is large, that is, when the operating speed of the actuators 31 of the work machine is high, the deviation per unit time caused by the communication delay between the operation amount of the actuators 31 of the work machine and the operation amount of the actuators 31 of the work machine intended by the operator is large, and setting a large correction state threshold LsX, from which the command correction value starts to decrease, enables the correction of a command signal when a communication delay occurs even a little. This way, if a communication delay, if small, occurs when the actuator operating speed of the work machine is high, the command signal will be corrected to be small, which reduces the deviation per unit time caused by the communication delay between the amount of operation of the actuators 31 of the work machine and the amount of operation of the actuators 31 of the work machine intended by the operator.

According to the graph in FIG. 7, the smaller the maximum operation command signal, the smaller the correction state threshold LsX from which the command correction value starts to fall from 1.0. This is because when the maximum operation command signal is small, that is, when the operating speed of the actuators 31 of the work machine is slow, the deviation per unit time caused by the communication delay between the operation amount of the actuators 31 of the work machine and the operation amount of the actuators 31 of the work machine intended by the operator is small. That is, when the operating speed of the actuators 31 is small, a small correction state threshold LsX, from which the command correction value starts to decrease, is set. This means that the command signals are not corrected until the communication is largely delayed. This way, if a communication delay occurs when the actuator operating speed of the work machine is slow, the work machine can be operated without correcting the command signals and lowering the speed in the range where the deviation per unit time caused by the communication delay between the amount of operation of the actuators 31 of the work machine and the amount of operation of the actuators 31 of the work machine intended by the operator is assumed to be small.

In this way, the correction state threshold (delay state determination threshold) LsX of the delay state Ls from which the command correction value starts to decrease from 1.0 can be set according to the operating speed of the plurality of actuators 31 of the work machine. This enhances the stability of the work machine and efficiently improves the operability.

Modified Example (3)

Figure 8:
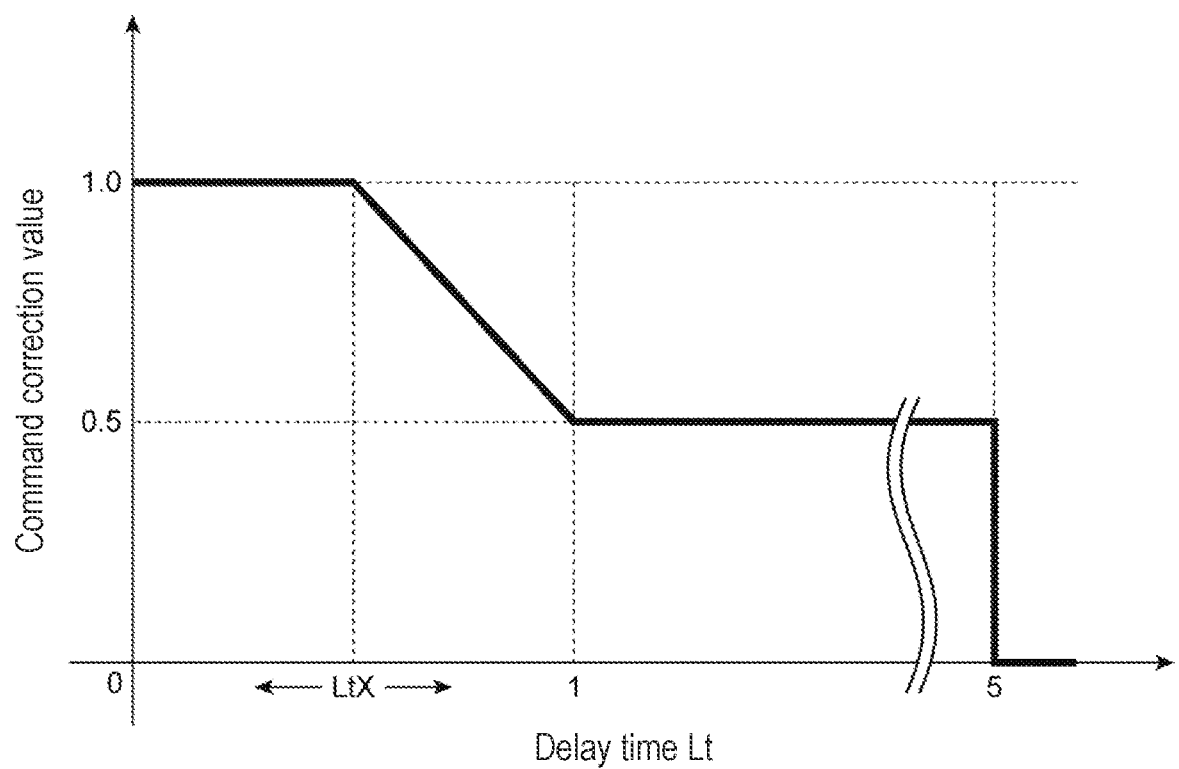
FIG. 8 shows a modified example of the calculation table of the command value calculation unit based on a delay time according to the first and second embodiments.
Figure 9:
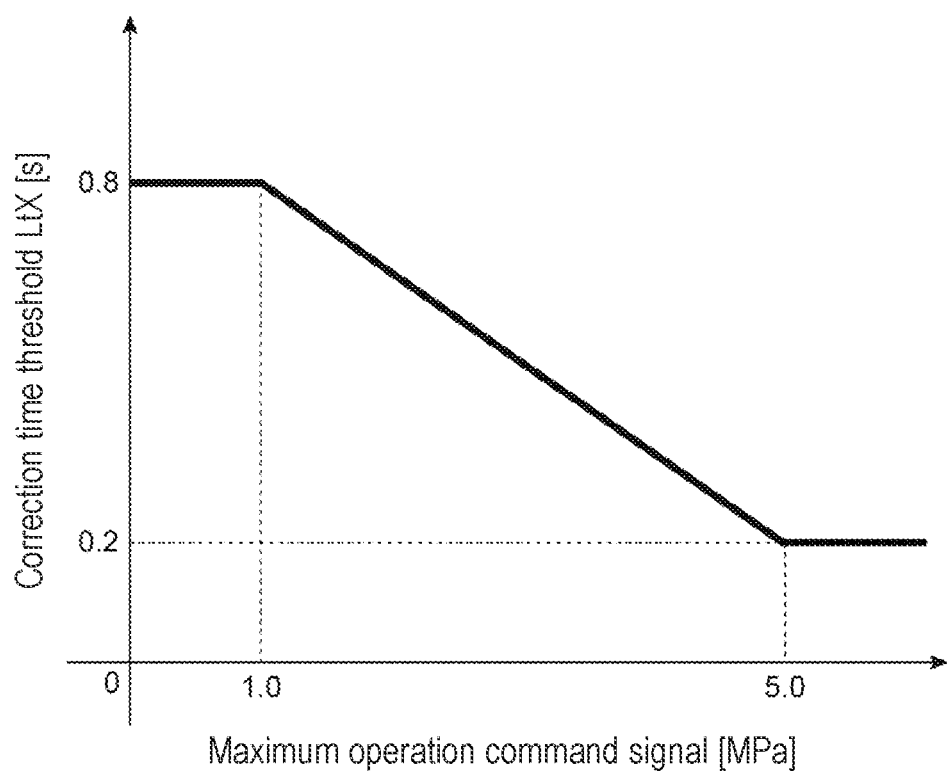
FIG. 9 shows a calculation table of the correction time threshold based on the maximum operation command signal according to the first and second embodiments.

In another example, the delay state determination unit 26 may determine a communication delay state as follows: the communication state determination units 25 and 28 monitor the transmission time when the operator-side remote controller 20 transmits a command signal and the reception time when the work-machine side remote controller 21 receives the command signal, and the delay state determination unit 26 outputs a communication delay state based on the two results. In this method, similarly to FIGS. 6 and 7 above, the correction time threshold (delay state determination threshold) LtX of the delay time Lt from which the command correction value starts to decrease from 1.0 is set depending on the operating speed of multiple actuators 31 of the work machine. The relationship between the delay time Lt and the command correction value is as shown in FIG. 8, and the relationship between the maximum operation command signal and the correction state threshold LtX is as shown in FIG. 9.

Second Embodiment

[Block Configuration of the Remote Control System]

Figure 10:
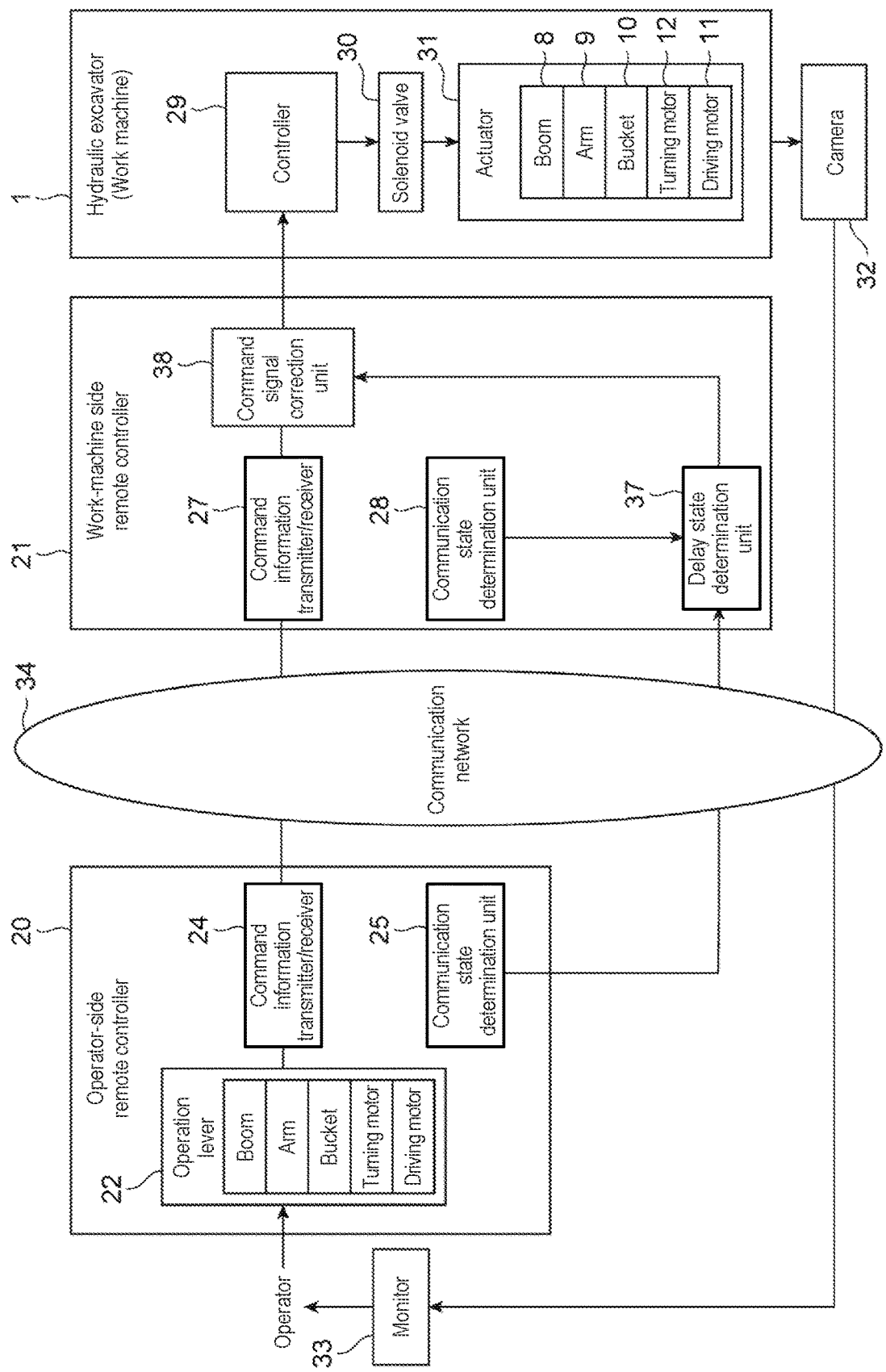
FIG. 10 is a block diagram of the structure of a remote control system for hydraulic excavator that is one example of the work machine according to a second embodiment.

FIG. 10 is a block diagram of the structure of a remote control system for hydraulic excavator that is one example of the work machine according to a second embodiment.

As described above, in the first embodiment, the operator-side remote controller 20 includes the delay state determination unit 26 that determines the communication delay state between the operator-side remote controller 20 and the work-machine side remote controller 21, and the command signal correction unit 23 that corrects command signals generated in response to the operation with the operation levers 22 based on the output from the delay state determination unit 26. With this configuration, all of the command signals output from the operation levers 22 are corrected before the operator-side remote controller 20 transmits the command signals to the work-machine side remote controller 21.

In contrast, in the second embodiment, a work-machine side remote controller 21 includes a delay state determination unit (delay state determination device) 37 and a command signal correction unit (command signal correction device) 38. With this configuration, all of the command signals output from the operation levers 22 and transmitted from the command information transmitter/receiver 24 of the operator-side remote controller 20 to the command information transmitter/receiver 27 of the work-machine side remote controller 21 via the communication network 34 are corrected before the command information transmitter/receiver 27 of the work-machine side remote controller 21 transmits the command signals to the controller 29 of the hydraulic excavator 1.

The delay state determination unit 37 functions in the same manner as the delay state determination unit 26 described in the first embodiment. Note that the delay state determination unit 37 receives signals from the communication state determination unit 25 of the operator-side remote controller 20 via the communication network 34, and directly receives signals from the communication state determination unit 28 of the work-machine side remote controller 21 within the device.

[Operation of the Delay State Determination Unit 37 of the Work-Machine Side Remote Controller 21]

As described above, the delay state determination unit 37 determines the communication delay state with the operator-side remote controller 20 based on the outputs of the communication state determination unit 25 of the operator-side remote controller 20 and of the communication state determination unit 28 of the work-machine side remote controller 21. Specifically, the delay state determination unit 37 determines the communication delay state of the command signal that the command information transmitter/receiver 27 of the work-machine side remote controller 21 receives relative to the command signal transmitted from the command information transmitter/receiver 24 of the operator-side remote controller 20, based on the outputs of the communication state determination unit 25 of the operator-side remote controller 20 and of the communication state determination unit 28 of the work-machine side remote controller 21.

The specific method of determining the communication state by the delay state determination unit 37 is the same as in the first embodiment.

[Operation of the Command Signal Correction Unit 38 of the Work-Machine Side Remote Controller 21]

The command value correction unit 38 has the same configuration as the command signal correction unit 23 (including the correction value calculation unit 35 and the correction value multiplication unit 36) shown in FIG. 3. The correction value calculation unit 35 outputs a command correction value to correct the command signals output from the operation levers 22. The command correction value is determined based on the delay state Ls, which is the output result of the delay state determination unit 37, in accordance with the graph (calculation table) shown in FIG. 4.

The correction value multiplication unit 36 multiplies all of the command signals output from the operation levers 22 being operated and received from the operator-side remote controller 20 (the command information transmitter/receiver 24 thereof) via the communication network 34 (i.e., all the command signals of the plurality of actuators 31 being operated with the operation levers 22) by the command correction value calculated by the correction value calculation unit 35 for (uniform) correction. With this configuration, all of the operation signals are uniformly corrected within the work-machine side remote controller 21 (i.e., before the command signals output from the operation levers 22 and transmitted from the command information transmitter/receiver 24 of the operator-side remote controller 20 to the command information transmitter/receiver 27 of the work-machine side remote controller 21 via the communication network 34 are transmitted from the command information transmitter/receiver 27 of the work-machine side remote controller 21 to the controller 29 of the hydraulic excavator 1) so as to keep the ratio of the plurality of operation lever displacements input by the operator with the operation levers 22.

The correction value multiplication unit 36 transmits the (corrected) command signals as the output result to the controller 29 of the hydraulic excavator 1.

[Advantageous Effects]

When an overshoot of the operating speed of the actuators 31 occurs due to the communication delay time, the second embodiment also limits a plurality of command speeds so as not to cause off-balance of the operating speeds of the actuators 31 being operated. The method for limiting a command speed so as not to cause off-balance of the operator's intended operation speed is uniformly correcting all of the operation signals in the work-machine side remote controller 21 so as to keep the ratio of the plurality of operation lever displacements input by the operator with the operation levers 22. This embodiment therefore leads to the same advantageous effects as those described in the first embodiment.

In the second embodiment, the delay state determination unit (delay state determination device) 37 and the command signal correction unit (command signal correction device) 38 are provided in the work-machine side remote controller 21, and the command signal correction unit (command signal correction device) 38 corrects all the command signals for the plurality of actuators 31 being operated before the command signals are transmitted from the work-machine side remote controller 21 to the work machine (controller 29 thereof).

According to the second embodiment, when the communication delay is detected, the correction information (corrected command signals) is transmitted to the controller 29 of the hydraulic excavator (work machine) 1 without going through the communication network 34. This allows the correction to be immediately reflected in the operation of the actuators 31. Further, one hydraulic excavator 1 may be operated while switching a plurality of operator-side remote controllers 20. In this case, the number of components of each operator-side remote controller 20 as the wireless remote controllers can be reduced, so that this embodiment reduces the cost as compared with the first embodiment described above, for example.

Note that the second embodiment can include the contents described above based on FIGS. 5 through 9 in addition to FIG. 4.

Third Embodiment

[Block Configuration of the Remote Control System]

Figure 11:
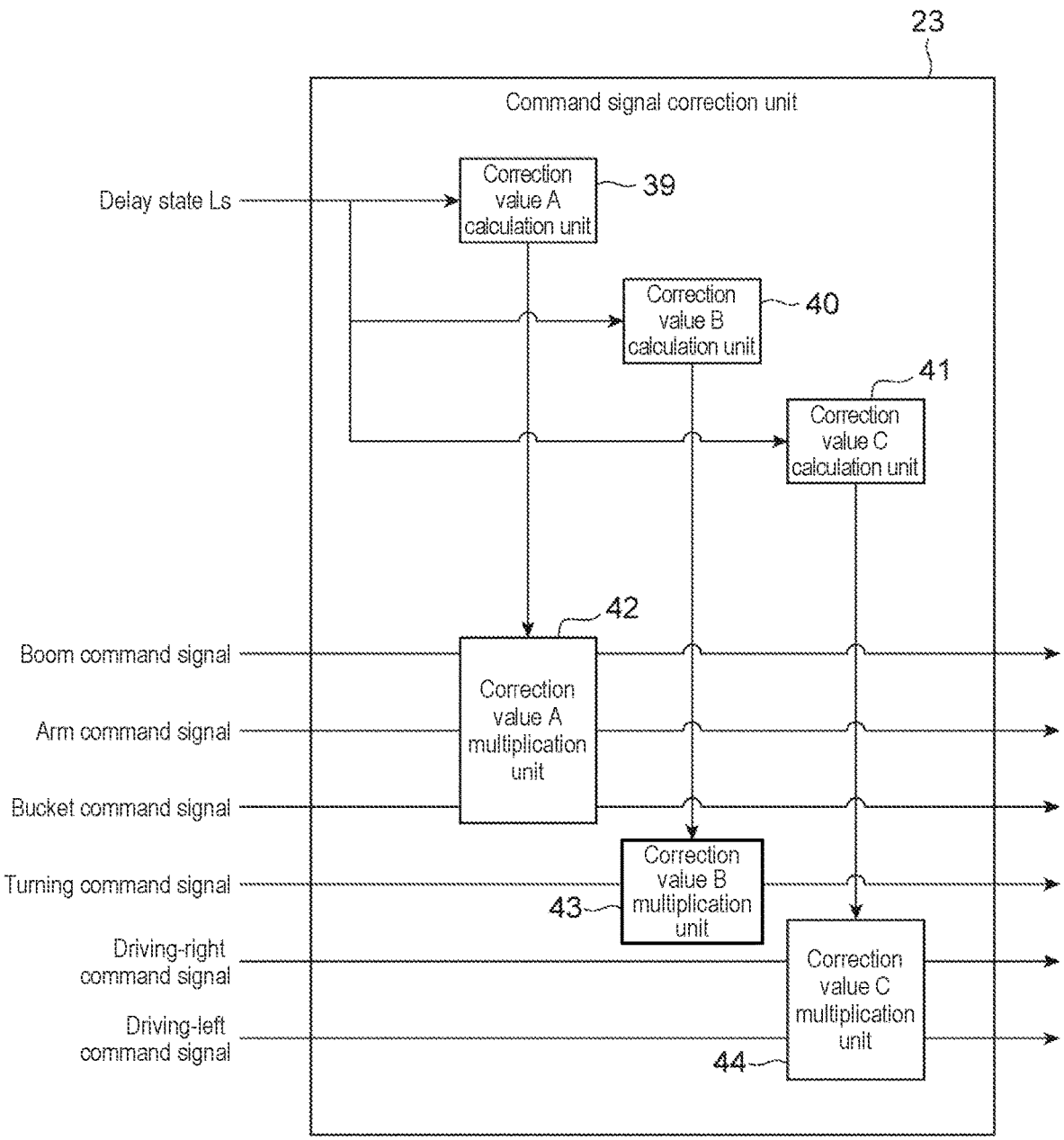
FIG. 11 is a block diagram of the structure of a command signal correction unit according to a third embodiment.

FIG. 11 is a block diagram of the structure of a command value correction unit in a remote control system for hydraulic excavator that is one example of the work machine according to a third embodiment. In the following description, the third embodiment will be described as a modification of the command value correction unit 23 of the operator-side remote controller 20 in the first embodiment. Needless to say, the configuration is applicable to the command value correction unit 38 of the work-machine side remote controller 21 in the second embodiment.

In the third embodiment, the configuration of the command value correction unit 23 in the first embodiment (or the command value correction unit 38 in the second embodiment) is as shown in FIG. 11. Specifically, the command value correction unit 23 functions as a correction calculation unit that calculates a command correction value to correct command signals output from the operation levers 22 based on the delay state Ls as the output result of the delay state determination unit 26, and outputs the command correction value. To this end, the command value correction unit 23 includes: a correction value A calculation unit 39, which calculates a command correction value A for correcting the command signals of the boom 8, arm 9, and bucket 10 (boom command signal, arm command signal, and bucket command signal) based on the delay state Ls; a correction value B calculation unit 40, which calculates a command correction value B for correcting the command signal of the turning motor 12 (turning command signal) based on the delay state Ls; and a correction value C calculation unit 41, which calculates a command correction value C for correcting the command signals of the right driving motor 11 and the left driving motor 11 (driving-right command signal and driving-left command signal) based on the delay state Ls.

Figure 12:
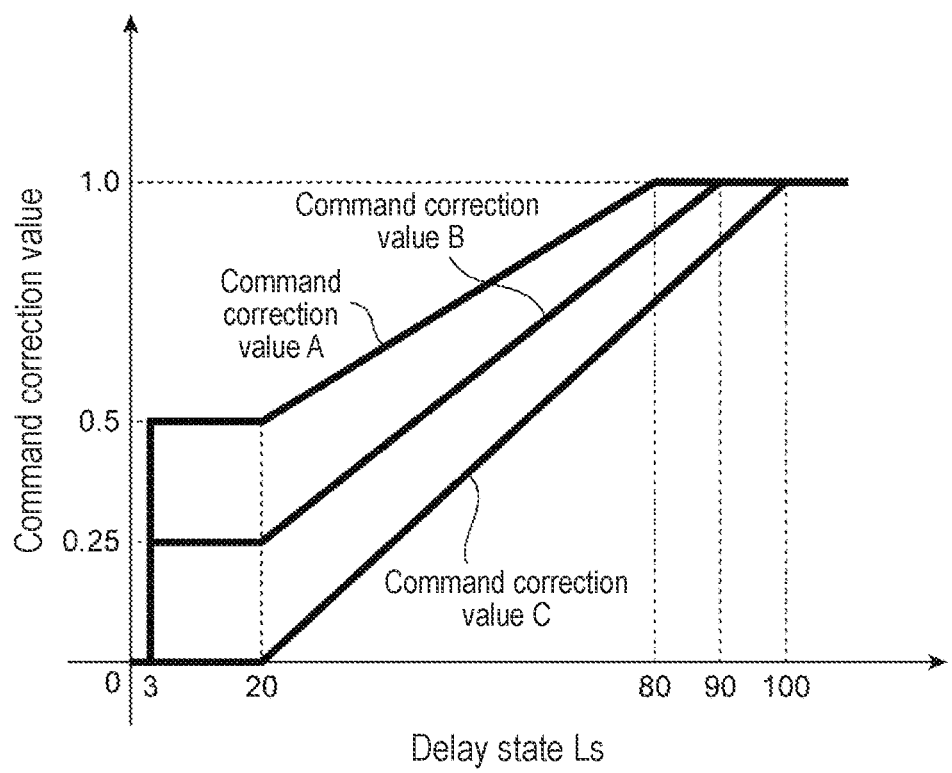
FIG. 12 shows a calculation table of a command value calculation unit based on a delay state according to the third embodiment.

The correction value A calculation unit 39, the correction value B calculation unit 40, and the correction value C calculation unit 41 calculate the command correction value A, the command correction value B, and the command correction value C, respectively, based on the delay state Ls in accordance with the calculation table as shown in FIG. 12 (details will be explained later).

A correction value A multiplication unit 42 multiplies the command signals of the boom 8, arm 9, and bucket 10 (boom command signal, arm command signal, and bucket command signal) by the command correction value A calculated by the correction value A calculation unit 39. A correction value B multiplication unit 43 multiplies the command signal of the turning motor 12 (turning command signal) by the command correction value B calculated by the correction value B calculation unit 40. A correction value C multiplication unit 44 multiplies the command signals of the right driving motor 11 and the left driving motor 11 (driving-right command signal and driving-left command signal) by the command correction value C calculated by the correction value C calculation unit 41.

[Operation of the Command Signal Correction Unit 23 of the Operator-Side Remote Controller 20]

When the correction value A calculation unit 39, the correction value B calculation unit 40, and the correction value C calculation unit 41 calculate the command correction value A, the command correction value B, and the command correction value C, respectively, based on the graph (calculation table) shown in FIG. 12, they can change the command correction value for each of the actuators 31 depending on the communication delay state Ls.

The graph of FIG. 12 shows the command correction value A, command correction value B, and command correction value C calculated based on the delay state Ls. For example, for the command correction value A, during the delay state Ls=80 to 100, which is determined a good communication state, the command correction value of 1.0 is output for the command correction value A, which means that the command signals are not corrected. During the delay state Ls=20 to 80, as the delay state Ls decreases (that is, the communication state worsens), the command correction value A decreases gradually. For the command correction value B, during the delay state Ls=90 to 100, which is determined a good communication state, the command correction value of 1.0 is output for the command correction value B, which means that the command signals are not corrected. During the delay state Ls=20 to 90, as the delay state Ls decreases (that is, the communication state worsens), the command correction value B decreases gradually. For the command correction value C, at the delay state Ls=100, the command correction value of 1.0 is output for the command correction value C, which means that the command signals are not corrected. During the delay state Ls=20 to 100, as the communication delay state Ls decreases (that is, the communication state worsens), the command correction value C decreases gradually. When the delay state Ls=20, the command correction value A, the command correction value B, and the command correction value C are 0.5, 0.25, and 0, respectively, and the command signals of the boom 8, arm 9, and bucket 10 are reduced to 0.5 time, the command signal of the turning motor 12 is reduced to 0.25 time, and the command signals of the right driving motor 11 and the left driving motor 11 are reduced to 0 time. Further, when the delay state is less than Ls=3, it is determined that the communication state is extremely bad, the command correction values A and B also are immediately lowered to 0.

The correction value A multiplication unit 42, the correction value B multiplication unit 43, and the correction value C multiplication unit 44 multiply all the command signals output from the operation levers 22 being operated (i.e., all the command signals of the plurality of actuators 31 being operated via the operation levers 22) by the command correction value A, the command correction value B, and the command correction value C calculated by the correction value A calculation unit 39, the correction value B calculation unit 40, and the correction value C calculation unit 41 for correction, that is, correct the command signal for each of the plurality of actuators 31 being operated via the operation levers 22. In this way, if a communication delay time exceeds a corresponding threshold, the system of this embodiment changes the degree of limitation (deceleration) for the specific actuator 31.

[Advantageous Effects]

In this way, this embodiment changes the command correction value based on the delay state depending on the actuators 31, which changes the behavior of the operation restriction of each actuator 31 according to the communication state.

For example, when the delay state Ls=20, it is determined that the communication delay state is very bad. Then, the command correction value A, the command correction value B, and the command correction value C are set to 0.5, 0.25, and 0, respectively, meaning that the boom 8, the arm 9 and the bucket 10 operate with half the operation command, and the turning motor 12 operates with the ¼ operation command. For the right driving motor 11 and the left driving motor 11, the command signal is multiplied by zero, meaning that these motors will not operate in response to the operation by the operator with the operation levers 22.

If the deviation is large between the operation of the work machine displayed on the monitor 33 and the actual operation of the work machine, this configuration sets some actuators 31 to slow down the operation and other actuators 31 that do not operate (or extremely slow down). This reduces the possibility that the work machine falls into a dangerous state when the communication state is poor while keeping the work efficiency without stopping some works that do not become a dangerous state.

As described above, in the third embodiment, the command signal correction unit (command signal correction device) 23 corrects the command signal for each of the plurality of actuators 31 being operated.

The command signal correction unit (command signal correction device) 23 is configured so that the delay state determination threshold and a command correction value in accordance with the communication delay state to correct the command signal are set for each of the plurality of actuators 31.

In other words, when an overshoot of the operating speed of the actuators 31 occurs due to the communication delay time, the third embodiment limits a plurality of command speeds so as not to cause off-balance of the operating speeds of the actuators 31 being operated. Further, when the communication delay time exceeds a certain threshold, this embodiment gives priority to limiting the speed of a specific actuator 31 rather than keeping the operating speed balance of the actuators 31 being operated, for example, to prevent the falling of the hydraulic excavator 1 during traveling. The method for limiting a command speed so as not to cause off-balance of the operator's intended operation speed is, when the communication delay time exceeds a certain threshold, changing the way of applying limitations for a specific actuator 31.

Similarly to the first and second embodiments, according to the third embodiment, a remote control system for a work machine having a plurality of actuators 31 corrects all command signals for the actuators 31 being operated when a communication delay time occurs during operation with the actuators 31. This limits the operation of the actuators 31 while keeping the ratio of the command signals (operation signals) of the actuators 31, and thus keeps the operating balance of the actuators 31 that the operator intends and facilitates the operation. Limiting the command signals in this way reduces the deviation between the operating state of the work machine that the operator can understand on the monitor 33 and the actual operating state of the work machine, so that the operator is able to input accurate feedback to the operation levers 22 based on the visual result on the work machine displayed on the monitor 33 for efficient work.

According to the third embodiment, if a communication delay time becomes large, the system changes the degree of limitation for a specific actuator 31, which prevents the falling of the hydraulic excavator 1 during traveling, for example.

Modified Example (1)

Figure 13:
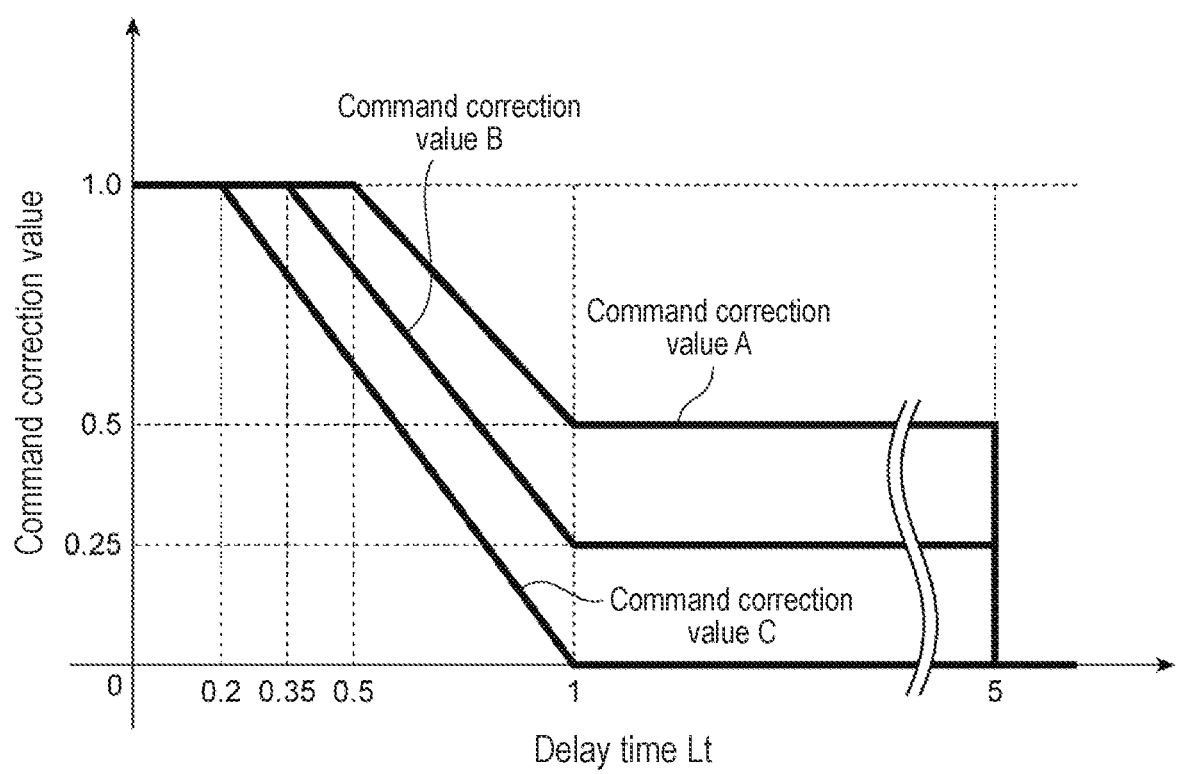
FIG. 13 shows a calculation table of the command value calculation unit based on a delay time according to the third embodiment.

The delay state determination unit 26 may determine a communication delay state as follows: the communication state determination units 25 and 28 monitor the transmission time when the operator-side remote controller 20 transmits a command signal and the reception time when the work-machine side remote controller 21 receives the command signal, and the delay state determination unit 26 determines the communication delay state using the communication delay time Lt output based the two results. In this method, the correction value A calculation unit 39, the correction value B calculation unit 40, and the correction value C calculation unit 41 of the command value correction unit 23 calculate the command correction value A, the command correction value B, and the command correction value C, respectively, based on the graph (calculation table) shown in FIG. 13 based on the delay time Lt. The graph of FIG. 13 shows the command correction value A, command correction value B, and command correction value C calculated based on the delay time Lt. For example, for the command correction value A, during the delay time Lt=0 to 0.5, which is determined a good communication state, the command correction value of 1.0 is output for the command correction value A, which means that the command signals are not corrected. During the delay time Lt=0.5 to 1.0, as the delay time Lt increases (that is, the communication state worsens), the command correction value A decreases gradually. For the command correction value B, during the delay time Lt=0 to 0.35, which is determined a good communication state, the command correction value of 1.0 is output for the command correction value B, which means that the command signals are not corrected. During the delay time Lt=0.35 to 1.0, as the delay time Lt increases (that is, the communication state worsens), the command correction value B decreases gradually. For the command correction value C, during the delay time Lt=0 to 0.2, which is determined a good communication state, the command correction value of 1.0 is output for the command correction value C, which means that the command signals are not corrected. During the delay time Lt=0.2 to 1.0, as the delay time Lt increases (that is, the communication state worsens), the command correction value C decreases gradually. When the delay time Lt=1.0, the command correction value A, the command correction value B, and the command correction value C are 0.5, 0.25, and 0, respectively, and the command signals of the boom 8, arm 9, and bucket 10 are reduced to 0.5 time, the command signal of the turning motor 12 is reduced to 0.25 time, and the command signals of the right driving motor 11 and the left driving motor 11 are reduced to 0 time. Further, when the delay time Lt=5.0 or more, it is determined that the communication state is extremely bad, the command correction values A and B also are immediately lowered to 0.

The correction value A multiplication unit 42, the correction value B multiplication unit 43, and the correction value C multiplication unit 44 of the command correction unit 23 multiply all the command signals output from the operation levers 22 being operated (i.e., all the command signals of the plurality of actuators 31 being operated via the operation levers 22) by the command correction value A, the command correction value B, and the command correction value C calculated by the correction value A calculation unit 39, the correction value B calculation unit 40, and the correction value C calculation unit 41 for correction, that is, correct the command signal for each of the plurality of actuators 31 being operated via the operation levers 22. In this way, if a communication delay time exceeds a corresponding threshold, the system of this embodiment changes the degree of limitation (deceleration) for the specific actuator 31.

Modified Example (2)

Figure 14:
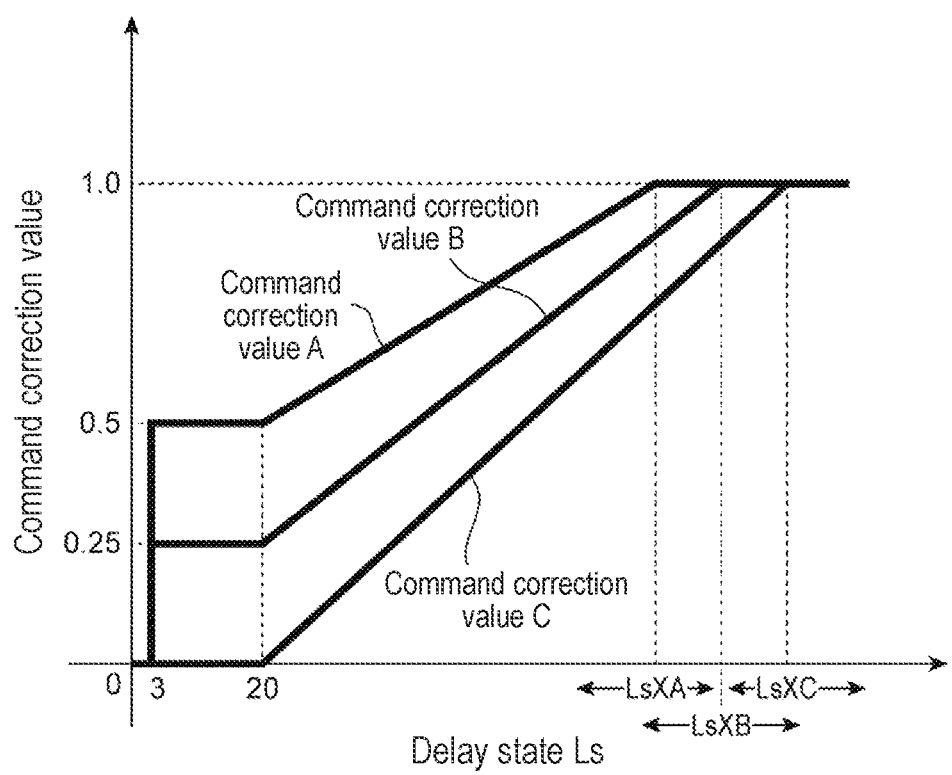
FIG. 14 shows a modified example of the calculation table of the command value calculation unit based on a delay state according to the third embodiment.
Figure 15:
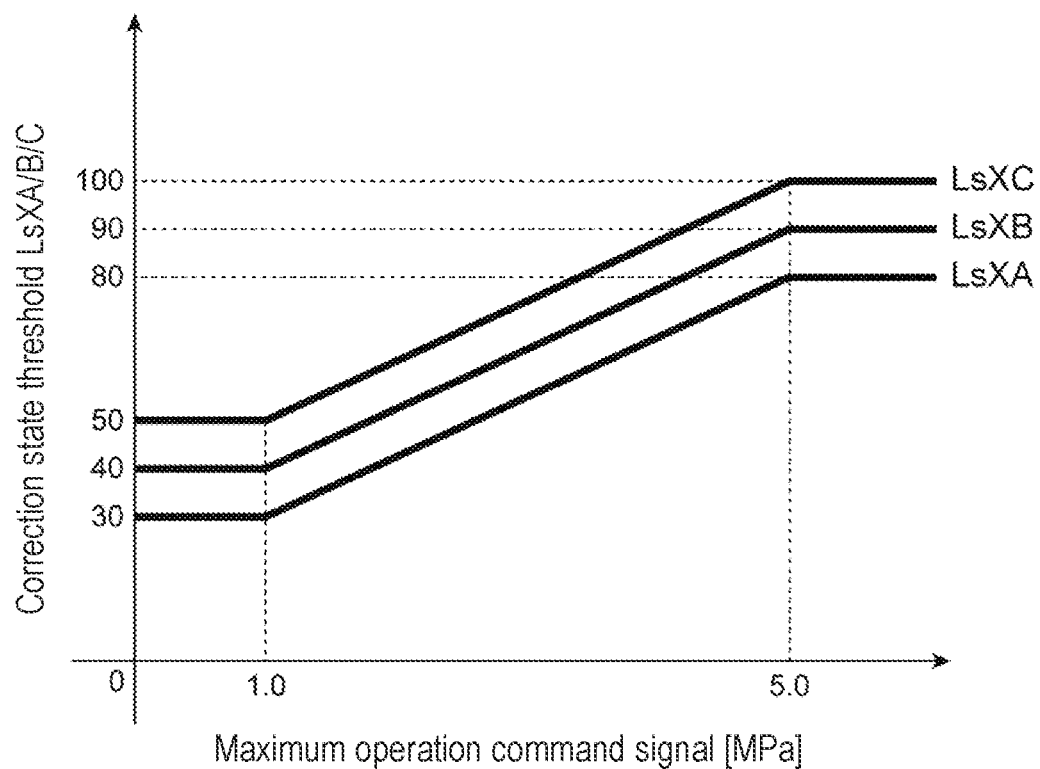
FIG. 15 shows a calculation table of the correction state threshold based on the maximum operation command signal according to the third embodiment.

The relationship between the delay state Ls and the command correction value used in the command value correction unit 23 (the correction value A calculation unit 39, the correction value B calculation unit 40, and the correction value C calculation unit 41 thereof) may be set as shown in FIG. 14. In the graph (calculation table) of FIG. 14, the thresholds LsXA, LsXB, and LsXC of the delay state Ls (the threshold to determine whether correction is required or not, hereinafter also referred to as the correction state thresholds), from which the command correction values A, B, and C start to decrease from 1.0, are determined based on the graph (calculation table) in FIG. 15. FIG. 15 shows the relationship between the largest operation command signal (maximum operation command signal) for the command signals of the actuators 31 being operated in the work machine and the correction state thresholds LsXA, LsXB, and LsXC. According to the graph in FIG. 15, the larger the maximum operation command signal, the larger the correction state thresholds LsXA, LsXB, and LsXC, from which the command correction value starts to fall from 1.0, and the smaller the maximum operation command signal, the smaller the correction state thresholds LsXA, LsXB, and LsXC, from which the command correction value starts to fall from 1.0.

This is because when the maximum operation command signal is large, that is, when the operating speed of the actuators 31 of the work machine is high, the deviation per unit time caused by the communication delay between the operation amount of the actuators 31 of the work machine and the operation amount of the actuators 31 of the work machine intended by the operator is large, and setting large correction state thresholds LsXA, LsXB, and LsXC, from which the command correction value starts to decrease, enables the correction of a command signal when a communication delay occurs even a little. This way, if a communication delay, if small, occurs when the actuator operating speed of the work machine is high, the command signal will be corrected to be small, which reduces the deviation per unit time caused by the communication delay between the amount of operation of the actuators 31 of the work machine and the amount of operation of the actuators 31 of the work machine intended by the operator.

According to the graph in FIG. 15, the smaller the maximum operation command signal, the smaller the correction state thresholds LsXA, LsXB, and LsXC, from which the command correction value starts to fall from 1.0. This is because when the maximum operation command signal is small, that is, when the operating speed of the actuators 31 of the work machine is slow, the deviation per unit time caused by the communication delay between the operation amount of the actuators 31 of the work machine and the operation amount of the actuators 31 of the work machine intended by the operator is small. That is, when the operating speed of the actuators 31 is small, small correction state thresholds LsXA, LsXB, and LsXC, from which the command correction value starts to decrease, are set. This means that the command signals are not corrected until the communication is largely delayed. This way, if a communication delay occurs when the actuator operating speed of the work machine is slow, the work machine can be operated without correcting the command signals and lowering the speed in the range where the deviation per unit time caused by the communication delay between the amount of operation of the actuators 31 of the work machine and the amount of operation of the actuators 31 of the work machine intended by the operator is assumed to be small.

In this way, the correction state thresholds (delay state determination thresholds) LsXA, LsXB, and LsXC of the delay state Ls from which the command correction values A, B, and C start to decrease from 1.0 can be set according to the operating speeds of the plurality of actuators 31 of the work machine. This enhances the stability of the work machine and efficiently improves the operability.

Modified Example (3)

Figure 16:
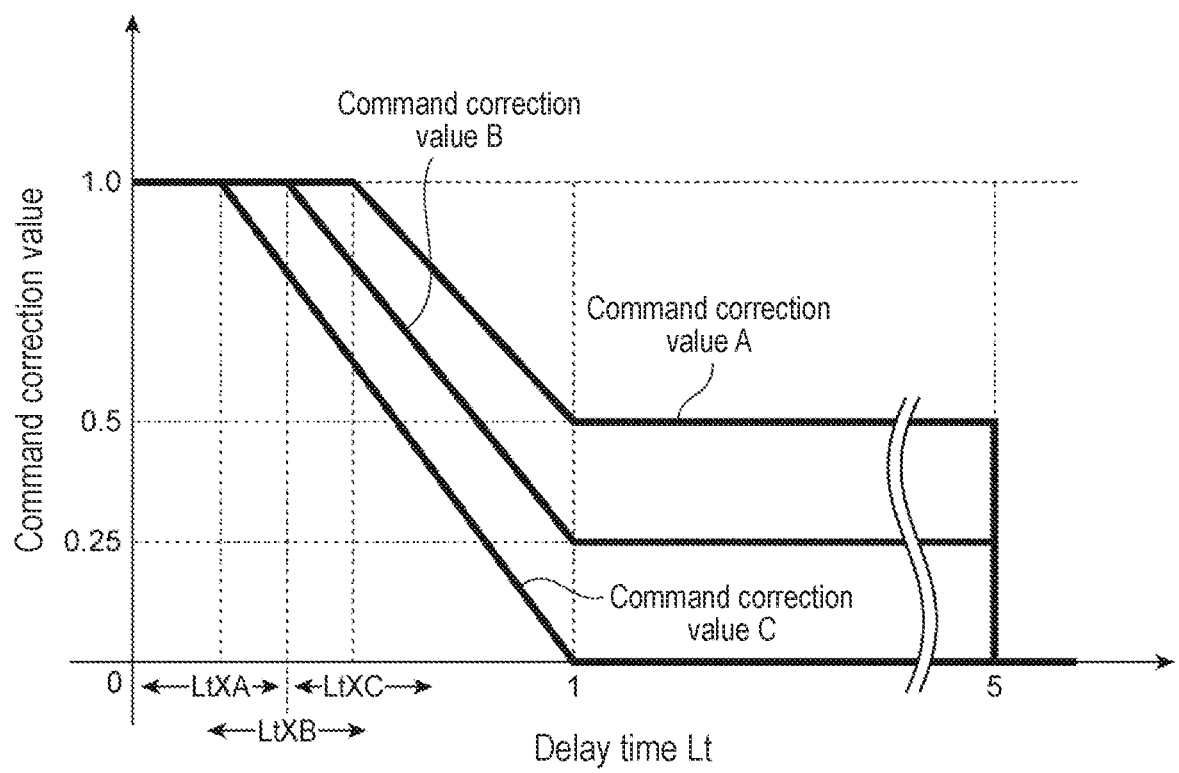
FIG. 16 shows a modified example of the calculation table of the command value calculation unit based on a delay time according to the third embodiment.
Figure 17:
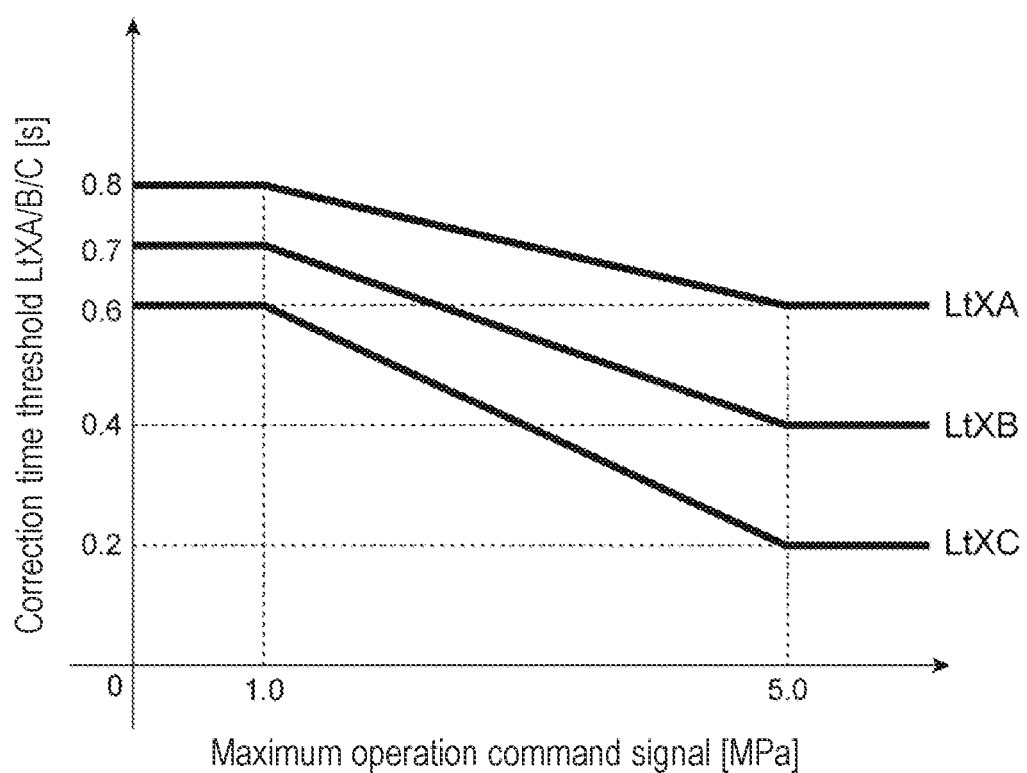
FIG. 17 shows a calculation table of the correction time threshold based on the maximum operation command signal according to the third embodiment.

In another example, the delay state determination unit 26 may determine a communication state as follows: the communication state determination units 25 and 28 monitor the transmission time when the operator-side remote controller 20 transmits a command signal and the reception time when the work-machine side remote controller 21 receives the command signal, and the delay state determination unit 26 outputs a communication delay state based on the two results. In this method, similarly to FIGS. 14 and 15 above, the correction time thresholds (delay state determination thresholds) LsXA, LsXB, LsXC of the delay time Lt from which the command correction values A, B, and C start to decrease from 1.0 are set depending on the operating speed of multiple actuators 31 of the work machine. The relationship between the delay time Lt and the command correction values A, B, and C is as shown in FIG. 16, and the relationship between the maximum operation command signal and the correction state thresholds LtXA, LtXB, and LtXC is as shown in FIG. 17.

The present invention is not limited to these embodiments, and may include various modifications. The entire detailed configuration of the embodiments described above for explanatory convenience is not always necessary for the present invention.

A part or all of the functions that the controllers of the above-described embodiments have may be designed as an integrated circuit and may be implemented as hardware. The processor may interpret and execute a program that implements each function, thereby implementing the functions as software. Programs for implementing these functions, and information such as tables, and files can be stored in a storage device in the controller, a recording device such as a hard disk or SSD (Solid State Drive), or a recording medium such as an IC card, SD card, or DVD.

REFERENCE SIGNS LIST

1 Hydraulic excavator (work machine or construction machine)
2 Lower traveling body
3 Upper turning body
7 Front unit
8 Boom
9 Arm 10 Bucket
11 Driving motor
12 Turning motor
20 Operator-side remote controller
21 Work-machine side remote controller
22 Remote control operation lever
23 Command signal correction unit (command signal correction device)
24 Command information transmitter/receiver (in operator-side remote controller)
25 Communication state determination unit (in operator-side remote controller)
26 Delay state determination unit (delay state determination device)
27 Command information transmitter/receiver (in work-machine side remote controller)
28 Communication state determination unit (in work-machine side remote controller)
29 Controller
30 Solenoid valve
31 Actuator
32 Camera (operation state confirmation device)
33 Monitor (operation state display device)
34 Communication network
35 Correction value calculation unit
36 Correction value multiplication unit
37 Delay state determination unit (delay state determination device)
38 Command signal correction unit (command signal correction device)
39 Correction value A calculation unit
40 Correction value B calculation unit
41 Correction value C calculation unit
42 Correction value A multiplication unit
43 Correction value B multiplication unit
44 Correction value C multiplication unit

The invention claimed is:

1. A remote control system for work machine having a plurality of actuators, the remote control system comprising:
one or more operation levers configured to enable the operator to simultaneously operate the plurality of actuators;
an operator-side remote controller configured to transmit command signals for simultaneously operating the plurality of actuators via a communication network, the command signals being generated in response to the simultaneous operation with the one or more operation levers;
a work-machine side remote controller configured to receive the command signals via the communication network and transmit the command signals to the work machine;
a delay state determination device configured to determine communication delay states for each command signal of the command signals that the work-machine side remote controller receives relative to each command signal of the command signals transmitted from the operator-side remote controller; and
a command signal correction device configured to, when it is determined that at least one communication delay state of the command signals is above a preset delay state determination threshold and regardless of whether at least one communication delay state of the command signals is equal to or below the preset delay state determination threshold, correct all the command signals of the plurality of actuators being simultaneously operated so as to maintain a ratio among all the command signals.

2. The remote control system for work machine according to claim 1, wherein the command signal correction device corrects all the command signals of the plurality of actuators being simultaneously operated so that operating speeds of the plurality of actuators become slower as a highest of the communication delay states of the command signals increases.

3. The remote control system for work machine according to claim 1, wherein when at least one communication delay state of the command signals is determined to be above a preset communication disruption determination threshold, the command signal correction device determines that communication is disrupted and corrects all the command signals of the plurality of actuators being simultaneously operated so that the plurality of actuators will not operate.

4. The remote control system for work machine according to claim 1, wherein the delay state determination threshold is set in accordance with operating speeds of the plurality of actuators being simultaneously operated.

5. The remote control system for work machine according to claim 1, wherein the delay state determination device and the command signal correction device are disposed in the operator-side remote controller, and the command signal correction device corrects all the command signals of the plurality of actuators being simultaneously operated before the command signals are transmitted from the operator-side remote controller to the work-machine side remote controller.

6. The remote control system for work machine according to claim 1, wherein the delay state determination device and the command signal correction device are disposed in the work-machine side remote controller, and the command signal correction device corrects all the command signals of the plurality of actuators being simultaneously operated before the command signals are transmitted from the work-machine side remote controller to the work machine.

7. The remote control system for work machine according to claim 1, wherein when at least one communication delay state of the command signals is determined to be above a preset delay state determination threshold, the command signal correction device outputs a command correction value in accordance with the communication delay state and multiplies all the command signals of the plurality of actuators being simultaneously operated by the command correction value for correction.

8. The remote control system for work machine according to claim 1, further comprising:
an operation state confirmation device configured to externally confirm an operating state of the work machine; and
an operation state display device configured to receive an output of the operation state confirmation device via the communication network to let the operator view the output.

* * * * *